July 29, 1947. H. E. RIGGS 2,424,709
APPARATUS FOR CUTTING RUBBER SHEET STOCK AND THE LIKE
Filed Sept. 5, 1945 2 Sheets-Sheet 1

Inventor
Herbert E. Riggs

Inventor
Herbert E. Riggs

Patented July 29, 1947

2,424,709

UNITED STATES PATENT OFFICE 2,424,709

APPARATUS FOR CUTTING RUBBER SHEET STOCK AND THE LIKE

Herbert E. Riggs, Akron, Ohio, assignor to Wingfoot Corporation, Akron, Ohio, a corporation of Delaware Application September 5, 1945, Serial No. 614,558

10 Claims. (Cl. 164—71)

1

The present invention relates to apparatus of the type employed in cutting heat-softenable plastic material such, for example, as rubber sheet stock and the like. More particularly, the invention is concerned with a machine embodying means for automatically heating and actuating a cutting means to produce cut sheet stock conforming to a predetermined pattern for fabrication into special products.

It is an object of the present invention to provide means for producing plastic or rubber material in sheet form which is cut to conform to a predetermined pattern such, for example, as that employed in the manufacture of special sizes of pneumatic tubes for use in tires as well as other similar products.

It is a further object of the present invention to provide a highly advantageous means for forming cut shapes of varying sizes from plastic or rubber sheet stock.

Another object of the present invention is to provide a cutting apparatus which combines a plurality of cutting edges and means for heating the cutting edges to facilitate the shearing of relatively heavy sheets of plastic or rubber material.

A still further object of the present invention is to provide a cutting mechanism which will operate to produce a clean cut edge in the plastic or rubber material being characterized by a bevel or tapered edge which is capable of being fitted with other similar edges in assembling the parts into a given product.

A still further object of the present invention is to provide an apparatus for cutting sheet plastic or rubber material to conform to a given pattern embodying heated cutting means operated by a temperature control means which serves not only to maintain a predetermined temperature of the knives but also to initiate the cutting operation when the cutting means have attained a predetermined temperature sufficient to enable them to cut through the material.

Other features, objects and advantages of the present invention will be apparent as the detailed discussion of the accompanying drawings proceeds.

Figures 1, 2, 3, 4:
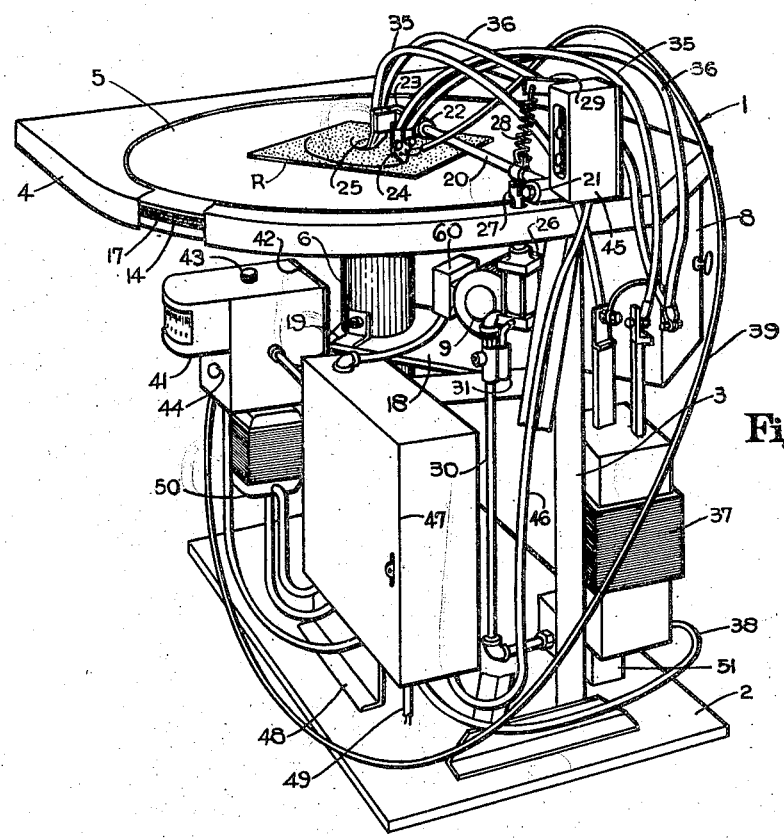

Figure 1 of the drawings represents a perspective view of a typical form of cutting apparatus embodying the teachings of the present invention. Figure 2 is a partial side elevation of the driving mechanism employed in rotating the table of the cutting apparatus of Figure 1. Figure 3 is a front elevation of one of the cutting knives employed in the cutting machine. Figure 4 is a side

Figure 5:
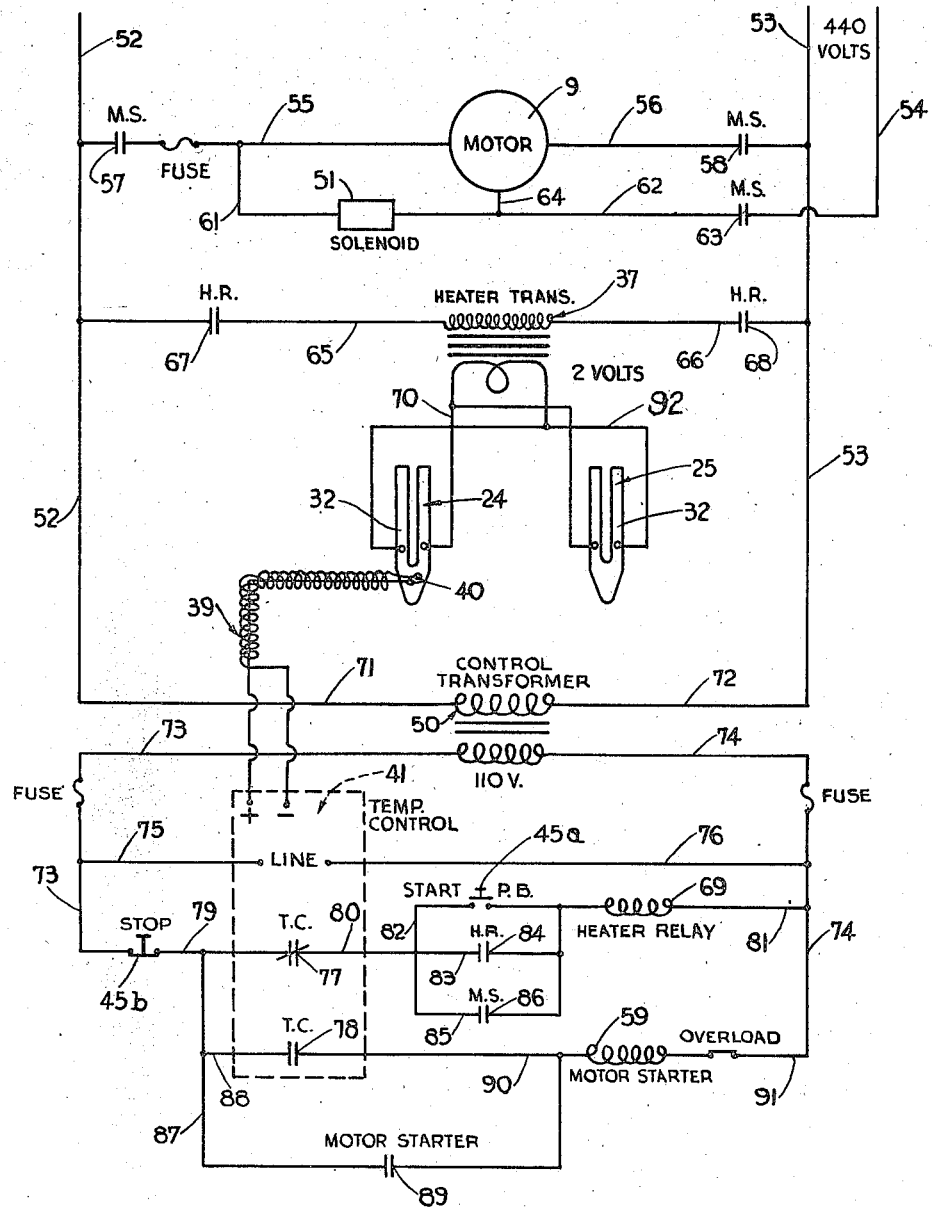

2 elevation of another cutting knife similar to that of Figure 3. Figure 5 is a schematic representation of the electrical wiring circuit of the apparatus of Figure 1 illustrating its method of operation.

In Figure 1 of the drawings, a form of cutting apparatus embodying the teachings of the present invention is indicated generally by the reference character 1. The cutting apparatus 1 comprises a base 2 and a frame 3 supporting a stationary platform 4. A generally circular table 5 is disposed substantially centrally of the platform 4 and is mounted upon the uppermost end of the column 6 in rotatable relation.

The table 5 may advantageously be provided with a surface of glass or other suitable heat resistant material on the under side of which a plurality of concentric circles (not shown) are scored to serve as measuring guides for the application of the sheet material R to be cut. Any suitable means may be employed for actuating the table 5 such, for example, as the drive means 7 (see Figure 2), at least part of which is adapted to be housed in the cabinet 8 secured to the under side of the platform 4. The prime mover of the drive means 7, in this case, the motor 9, is preferably disposed outside the cabinet 8 where it is supported upon a horizontal plate 18 secured by a bracket 19 to the column 6.

The motor 9 of the drive means 7 operates a gear reduction unit 10 through the coupling 11. A drive pulley 12 is mounted upon the output shaft 13 of the unit 10 and serves to drive the table 5 through the medium of the belt 14 trained over a series of guide pulleys in pairs 15 and 16. The belt 14 frictionally engages a groove 17 in the outer periphery of the table 5. Thus, the table 5 may be driven at a substantially uniform predetermined rate in keeping with the operation of the other elements of the apparatus hereinafter described in detail.

Mounted adjacent one side of the platform 4 is a tiltable supporting means or arm 20 which is swingable about a bracket 21 secured to a portion of the frame 3 extending above the platform. The arm 20 supports a pair of clamp means or holders 22, 23 with each of which is associated manually operable means such, for example, as a thumb screw or the like (not shown). Each of the holders 22, 23 has an axially extending groove (not shown) on its inner bore for registration with an axially extending feather (not shown) on the arm 20 to enable the holders 22 and 23 to be adjusted therealong. The holders 22, 23 carry knives 24, 25, respectively, which are adapted to cut the plastic sheet material R supported upon the rotatable table 5.

The arm 20 is advantageously adapted to be lowered into operating position with respect to the surface of the table 5 by a suitable pneumatic means or air cylinder 26. A linkage 27 attached at one end thereof to the piston of the air cylinder 26 and at its other end to the arm 20 extends through an opening in the platform 4 and operates to lower the arm 20 in opposition to the tension exerted by a coil spring 28. The spring 28 is attached to an anchorage 29 forming a part of the machine frame 3. The air cylinder 26 is operated by air under pressure supplied thereto by a suitable conduit 30 and released therefrom through the exhaust outlet 31. Thus, the arm 20 is lowered by the action of the cylinder 26 and raised by the action of spring 28 when the air is exhausted from the cylinder.

The knives 24 and 25 are generally of the type shown in Figures 3 and 4. The blade 32, in each instance, is advantageously split as indicated and has a pair of binding posts or studs 33, 34 soldered, welded or otherwise suitably secured thereto to afford a means of connecting electrical conductors to the blade for heating the knife 24, 25 to facilitate the cutting operation. The lower portion of the blade 32 is advantageously bent at a slight angle, as will best be seen in Figure 4 of the drawings, to impart a distinct bevel or taper to the cut edge of the plastic material. The knives 24 and 25 are advantageously oppositely beveled as will be noted from Figure 1 to insure a better fabricating joint for the finished article which is to be made from interfitting several cut sheets.

The studs 33, 34 on the blade 32 of each of the knives 24 and 25 are adapted to receive the electrical conductors 35, 36, respectively, connected to the heater transformer 37 to which electrical current is supplied by the flexible conduit 38. A suitable thermocouple 39 is secured to the blade 32 of one of the knives (knife 24, see Figure 5) as by means of the connection 40 and is, in turn, connected to an adjustable temperature control means 41. The control means 41 is preferably mounted upon a panel board 42 supported upon the base 2 of the machine. A manual control 43 on the temperature control means 41 makes possible the adjustment of the desired operating temperature of the knives 24 and 25. A tell-tale light 44 on the control means 41 indicates to the operator that the device is in operation.

The temperature control means 41 operates advantageously to govern the temperature of the knives 24 and 25 at all times and serves, when once regulated to the desired cutting temperature, to raise both knives to the proper temperature required for the cutting operation. The device thereafter maintains the knife at the proper predetermined temperature throughout the entire cutting step in operating cycle of the machine. In other words, as the cutting proceeds, the knife temperature ordinarily would drop but the temperature control means 41 is employed in the electrical operating circuit of the machine to insure the maintenance of the proper cutting temperature of the knives during the entire time they are in contact with the sheet R on the table 5.

It will be understood that the knives 24 and 25 themselves act as resistors which become heated to cutting temperature by the passage of electrical current therethrough from the heater transformer 37. The heater transformer 37 is advantageously of a type which produces a low voltage, high amperage output. Thus, the operating temperature for the knives 24, 25 can be reached quickly and maintained with the aid of the temperature control means 41 without substantial fluctuation and in the manner previously described.

A suitable start-stop switch 45 embodying a start button 45a and stop button 45b is provided for controlling the operation of the apparatus and may be mounted adjacent the platform 4 on a portion of the frame 3. The switch 45 controls the entire operating cycle of the machine and is connected as by means of a flexible conduit 46 to the other elements of the machine operating circuit hereinafter described in detail. Certain of the elements of the operating circuit are housed in the cabinet 47 secured to the column 6 and supported by bracket 48 from the base 2 of the machine 1. The cabinet 47 conveniently encloses such electrical units as a terminal block, relays, fuses, overload switches and other similar means (not shown) to complete the operating circuit of the machine.

As will be seen from Figure 1, the heater transformer 37 is connected by the flexible conduit 38 to the cabinet 47 into which a power line conduit 49 is connected. A control transformer 50 connected into the circuit serves to step down the line voltage to the standard voltage for the control portion of the circuit operating through the temperature control means 41 which is interconnected by suitable flexible conduits to the cabinet 47. A solenoid 51 serves to actuate a suitable two-way valve unit (not shown) which controls the operation of the air cylinder 26 for lowering the arm 20 at the proper time in the sequence of steps performed in the operating cycle of the machine in a manner hereinafter described in detail.

The electrical circuit shown diagrammatically in Figure 5 of the drawings serves to illustrate more clearly the method of operation of the device. It will be noted from Figure 5 that the power conduit 49 comprises conductors 52, 53 and 54 and supplies 440 volt current to operate the motor 9 and to supply the heater transformer 37 for heating the knives 24 and 25. This portion of the circuit is referred to as the operating portion. The motor 9 is connected across the power line conductors 52 and 53 as by means of the conductors 55 and 56, respectively, one of which may incorporate a fuse to protect the motor. The normally open pairs of contacts 57 and 58 in conductors 55 and 56, respectively, are adapted to close upon energization of the coil 59 of the motor starter 60 (see Figure 1) in a manner hereinafter to be described.

The solenoid 51 is connected across the main power line conductors 52 and 54 as by means of the conductors 61 and 62. The conductor 61 is connected, in turn, to conductor 55 between the motor 9 and the pair of contacts 57. The other conductor 62 is provided with a normally open pair of contacts 63 which are adapted to be closed when the motor starter coil 59 is energized. The motor 9 is additionally provided at one side thereof with an alternate connection to the main power line conductor 54 embodying the conductors 64 and 62.

The primary coil of the heater transformer 37 is connected across the main power line conductors 52 and 53 as by means of conductors 65 and 66. The pairs of contacts 67 and 68 are disposed in the conductors 65 and 66, respectively, between the primary coil of the heater transformer 37 and the main power conductor in each instance. The pairs of contacts 67 and 68 are normally open but are adapted to be closed when the heater relay coil 69 in the control portion of the circuit is energized. As previously indicated, the heater transformer 37 operates to reduce the power line voltage to a low voltage of the order of approximately two volts thereby affording a high amperage output.

The secondary coil of the heater transformer 37 is connected at one end to conductor 69 and at the other end to conductor 70. The conductors 69 and 70 are secured to the studs 33 and 34 on the knives 24 and 25. One of the knives, in this case knife 24, has secured thereto adjacent the cutting edge thereof, as at the connection 40, a thermocouple 39 which is, in turn, connected to the temperature control means 41. Thus, as the knives 24 and 25 are raised to the predetermined temperature for which the temperature control means 41 has been set, the current supplied to the heater transformer will be automatically cut off by the deenergization of the heater relay coil 69 which opens the pairs of heater relay contacts 67 and 68.

The primary coil of the control transformer 50 is also connected across the main power conductors 52 and 53 by means of conductors 71 and 72. The control transformer 50 is, as we have seen, intended to step down the 440 volt current supplied by the conductors 52 and 53 of the main power line to a standard 110 volt current for the operation of the control portion of the machine circuit. Thus, the secondary coil of the control transformer 50 is connected at each of its ends to conductors 73 and 74 which may be provided with suitable fuses to prevent overloads in the various relay coils and in the temperature control means 41.

The temperature control means 41 is connected across the conductors 73 and 74 as by means of the conductors 75 and 76. The temperature control means 41 embodies a normally closed pair of contacts 77 and a normally open pair of contacts 78. One of the contact points of the normally closed pair of contacts 77 is connected to the conductor 73 as by means of a conductor 79 in which is disposed the stop button 45b of the start-stop switch 45 together with its contacts. The other of the contact points of the normally closed pair of contacts 77 is connected to a conductor 80.

The conductor 80 is interconnected with one end of the coil 69 of the heater relay the other end of which is connected to the conductor 74 by a conductor 81 through a number of alternate connections. One of the alternate connections between the conductor 80 and the coil 69 is through conductor 82 in which is disposed the start button 45a of the start-stop switch 45 together with its associated contacts. Another of the alternate connections is through the conductor 83 in which is disposed a pair of contacts 84 which are normally open and adapted to be closed upon energization of the coil 69 of the heater relay. A still further alternate connection between conductor 80 and the heater relay coil 69 is through conductor 85 in which is disposed a normally open pair of contacts 86 which are adapted to be closed when the coil 59 of the motor starter 60 is energized.

The normally open pair of contacts 78 of the temperature control means 41 is connected to the conductor 79 as by means of conductors 87 and 88. In the conductor 87 is disposed a normally open pair of contacts 89 which are closed when the coil 59 of the motor starter 60 is energized. The other side of the open pair of contacts 78 is connected to the coil 59 of the motor starter 60 as by means of a conductor 90, while the other end of the coil 59 is, in turn, connected to the conductor 74 by means of a conductor 91 thereby completing the circuit.

In the operation of the machine of the present invention, the operator presses the start button 45a of the start-stop switch 45. This operation closes a circuit through the heater relay coil 69 from conductor 73 through the conductor 79 across the stop button 45b and the normally closed contacts 77 of the temperature control means 41, thence through conductors 80 and 82 (in the latter of which the start button is now in contact with its associated contacts) to one side of the coil 69 of the heater relay and from the other side thereof through the conductor 81 to conductor 74. The energization of the coil 69 of the heater relay immediately operates to close the contacts 67 and 68 in the conductors 65 and 66, respectively, completing the circuit across conductors 52 and 53 to the heater transformer 37 which supplies current through conductors 69 and 70 to the knives 24 and 25.

At the same time, the contacts 84 in the conductor 83 are closed by the energization of the coil 69 of the heater relay. The current continues to pass into the blade 32 of each of the knives 24 and 25 until the thermocouple 39 connected to the temperature control means 41 causes the latter to register the predetermined temperature setting which is to be obtained by the knives 24 and 25 sufficient to complete the cutting operation. When the predetermined temperature for the knives is reached, the normally closed pair of contacts 77 is opened and the normally open pair of contacts 78 of the temperature control means 41 is then closed.

As will be seen from Figure 5 of the drawings, when the contacts 77 of the temperature control means 41 are opened, the circuit through the coil 69 is broken and contacts 67 and 68 are again opened thereby causing a cessation in the flow of current from the power line conductors 52 and 53 through the heater transformer 37. At the instant that the contacts 78 of the temperature control means 41 are closed the current supplied from the secondary coil of the control transformer 50 through the conductor 73 is now caused to flow through the conductors 79 and 88 across the contacts 78 (now closed) through conductor 90 coil 59 of the motor starter 60 and conductor 91 to the conductor 74 at the other side of the control circuit. The energizing of the coil 59 of the motor starter 60 instantly closes the contacts 57, 58 and 63 starting the motor 9 and operating the solenoid 51. In addition, the contacts 86 and 89 in conductors 85 and 87, respectively, are closed when the coil 59 of the motor starter 60 is energized.

The motor 9 now causes the table 5 to rotate through the drive means 7 in the manner previously described. Simultaneously with the starting of the motor 9, the solenoid 51 is operated which causes the arm 20 carrying the knives 24 and 25 to be lowered to such a position with respect to the table 5 that the knives will begin cutting into the sheet stock R supported by the table while the table is rotated. If, as is usually the case in the course of the cutting operation, the knives 24 and 25 begin to cool down slightly the circuit is so arranged that the heater relay coil 69 will again be energized from the conductors 73 and 74 in the manner previously described to insure that the temperature of the knives is maintained without substantial fluctuation in keeping with the demand of the temperature control means 41 to restore the knives to their original predetermined cutting temperature.

When the temperature control means 41 determines that the temperature of the knives 24 and 25 is dropping below the predetermined normal operating temperature the contacts 78 previously closed are instantly opened and the contacts 77 will again close. The opening of contacts 78 will not affect the operation of the motor 9 in driving the table 5 nor the energization of the solenoid 51 by virtue of the fact that the contacts 89 are closed maintaining an alternate circuit to the motor starter coil 59 through the conductor 87 instead of across the contacts 78 temporarily open. Moreover, contacts 84 and 86 remain closed to keep the circuit to the heater relay coil 69 which serves to close the contacts 67 and 68 once again supplying current to the primary coil of the heater transformer 37 the instant contacts 77 are closed.

The cutting apparatus 1 will thus continue to function in the manner described until the operator presses the stop button 45b of the start-stop switch 45 breaking the control portion of the circuit. This action causes the motor 9 to stop rotating the table 5 by reason of the opening of the contacts 57, 58 and 63 caused by the deenergization of the coil 59 of the motor starter 60. At the same time, the solenoid 51 is deenergized and the arm 20 is raised by the action of the spring 28 when the air is exhausted from the air cylinder 26. It will be understood, however, that, by virtue of the several alternate circuits established as indicated in Figure 5, the motor 9 and the solenoid 51 will continue to function even though the control means 41 operates alternately to supply and to cut off current to the heater transformer 37.

It will be obvious that certain modifications may be embodied in the cutting apparatus hereinbefore described, in illustrating the teachings of the present invention, without in any way departing from the spirit or scope of invention.

While in accordance with the patent statutes one best known embodiment of the invention has been illustrated and described in detail, it is to be particularly understood that the invention is not limited thereto or thereby, but that the inventive scope is defined in the appended claims.

I claim:

1. In an apparatus for cutting rubber sheet stock and the like, cutting means, means supporting said cutting means, means for heating said cutting means to facilitate the cutting operation, means adjustably controlling the heating means to raise the cutting means to a predetermined minimum temperature and to maintain that temperature throughout the cutting operation, and means actuated by the control means for operating the supporting means to bring the heated cutting means into contact with the stock and to start the cutting operation.

2. In an apparatus for cutting rubber sheet stock and the like in conformance with a predetermined pattern, a rotatable table supporting said stock, means rotating said table, cutting means, means supporting said cutting means, means for heating said cutting means to facilitate the cutting operation, means adjustably controlling the heating means to raise the cutting means to a predetermined minimum temperature and to maintain that temperature throughout the cutting operation, and means actuated by the control means for operating the supporting means to bring the heated cutting means into contact with the stock and for starting the table rotating means.

3. Apparatus for cutting rubber sheet stock and the like comprising a pair of knives, tiltable means adjustably supporting said knives, electrical heating means for heating said knives to facilitate the cutting operation, adjustable control means for energizing the electrical heating means to raise the knives to a predetermined minimum temperature and to maintain that temperature throughout the cutting operation, and means actuated by the control means to lower the tiltable supporting means to bring the knives into contact with the stock when the knives have reached the desired predetermined temperature and to start the cutting operation.

4. Apparatus for cutting rubber sheet stock and the like comprising a rotatable table supporting said stock, means rotating said table, a pair of knives, tiltable means adjustably supporting said knives, electrical heating means for heating said knives to facilitate the cutting operation, adjustable control means for energizing the electrical heating means to raise the knives to a predetermined minimum temperature and to maintain that temperature throughout the cutting operation, and means actuated by the control means to lower the tiltable supporting means bringing the knives into contact with the stock when said knives have reached the desired predetermined temperature and to start the table rotating means.

5. Apparatus for cutting rubber sheet stock and the like comprising a pair of cutting knives, a stationary tiltable arm on which said knives are adjustably supported, electrical heating means for heating the knives to facilitate the cutting operation, an adjustable thermostatically operated control means for energizing the electrical heating means to heat the knives to a predetermined minimum temperature and to maintain that temperature throughout the cutting operation, pneumatically operated means for raising and lowering the tiltable arm to bring the knives into and out of contact with the stock, and a solenoid actuated by the control means to operate the pneumatic means when the knives have reached the desired predetermined temperature.

6. Apparatus for cutting rubber sheet stock and the like comprising a rotatably mounted table for supporting the sheet stock, means for rotating said table at a predetermined substantially constant speed, a pair of knives, a stationary tiltable arm on which said knives are adjustably supported, electrical heating means for heating said knives to facilitate the cutting operation, adjustable thermostatically operated control means for energizing the electrical heating means to raise the knives to a predetermined minimum temperature and to maintain that temperature throughout the cutting operation, means for raising and lowering the tiltable arm to bring the knives into and out of contact with the sheet stock, and a solenoid actuated by the control means to operate the pneumatic means for bringing the knives into contact with the stock when they have reached the desired predetermined temperature and to actuate the rotating means for driving the table with respect to the stationary arm.

7. In an apparatus for cutting rubber sheet stock and the like in conformance with a predetermined pattern, means supporting said stock, means for cutting the stock to a pattern, said cutting means and said supporting means being relatively movable to conform the stock to the pattern, actuating means for one of the foregoing means, means for heating said cutting means to facilitate the cutting operation, means adjustably controlling the heating means to raise the cutting means to a predetermined minimum temperature and to maintain that temperature throughout the cutting operation, and means actuated by the temperature control means for operating the supporting means to bring the heated cutting means into contact with the stock and for starting the actuating means.

8. Apparatus of the type defined in claim 3 in which the electrical heating means takes the form of a transformer delivering a low voltage, high amperage current and the knives act as resistors in which the current supplied by the transformer induces heat in accordance with the demand of the temperature control means.

9. Apparatus for cutting rubber sheet stock and the like comprising a rotatably mounted table for supporting the sheet stock, means for rotating said table at a predetermined substantially constant speed, a pair of knives, a stationary tiltable arm on which said knives are adjustably supported, a transformer delivering a low voltage, high amperage current to the knives, adjustable thermostatically operated control means for controlling the current delivered to the knives to raise them to a predetermined temperature and maintain them at that temperature throughout the cutting operation, an air cylinder for bringing the tiltable arm into position to cause the knives to cut the stock, a solenoid for actuating the air cylinder and the means for rotating the table at the instant the knives have reached the predetermined temperature.

10. Apparatus for cutting rubber sheet stock and the like comprising a rotatably mounted table for supporting the sheet stock, means for rotating the table at a predetermined substantially constant speed, a stationary tiltable arm mounted adjacent the table, a pair of knives adjustably secured to the arm, a transformer delivering a low voltage, high amperage current to the knives, adjustable thermostatically operated control means for controlling the current delivered to the knives to raise them to a predetermined temperature and maintain them at that temperature throughout the cutting operation, a thermocouple interconnecting one of the knives and the control means, an air cylinder for lowering the arm and the knives thereon into position to start cutting the stock, a solenoid actuated by the control means for operating the air cylinder and the rotating means at the instant the knives have reached the predetermined temperature suitable for the cutting operation.

HERBERT E. RIGGS.

REFERENCES CITED

The following references are of record in the file of this patent:

UNITED STATES PATENTS

| Number | Name | Date |
| --- | --- | --- |
| 553,278 | Childs | Jan. 21, 1896 |
| 534,061 | Childs | Feb. 12, 1895 |

Certificate of Correction

Patent No. 2,424,709.

July 29, 1947.

HERBERT E. RIGGS

It is hereby certified that errors appear in the printed specification of the above numbered patent requiring correction as follows: Column 5, lines 13 and 15, and column 6, line 29, for the reference numeral "69" read *92*; and that the said Letters Patent should be read with these corrections therein that the same may conform to the record of the case in the Patent Office.

Signed and sealed this 28th day of October, A. D. 1947.

[SEAL]

THOMAS F. MURPHY,
*Assistant Commissioner of Patents.*